United States Patent Office 3,112,337
Patented Nov. 26, 1963

3,112,337
4-HALO-3-SULFAMOYLBENZOIC ACID ESTERS
Horace A. De Wald, Milton L. Hoefle, and Ann Holmes, Ann Arbor, Mich., assignors to Parke, Davis & Company, Detroit, Mich., a corporation of Michigan
No Drawing. Filed May 9, 1960, Ser. No. 27,538
3 Claims. (Cl. 260—470)

The present invention relates to novel 4-halo-3-sulfamoylbenzoic acid esters and to methods for producing same. More particularly, the 4-halo-3-sulfamoylbenzoic acid esters with which the present invention is concerned are represented by the general formula

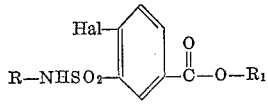

wherein Hal represents a bromine or chlorine atom; R represents a hydrogen atom or methyl radical and $R_1$ represents a lower alkyl radical, lower alkoxyalkyl, lower alkylthioalkyl, the allyl radical, the —$CH_2C\equiv N$ radical, the

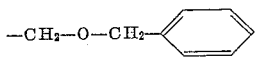

radical, the

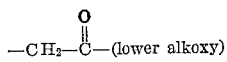

radical or a lower dialkylaminoalkyl radical containing fewer than 7 carbon atoms. Preferred lower alkyl radicals are methyl, ethyl and propyl.

In accordance with the invention, the novel 4-halo-3-sulfamoylbenzoic acid esters of the above formula are produced by reacting a 4-halo-3-sulfamoylbenzoic acid of the formula

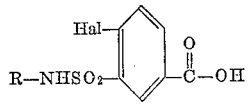

or a functional derivative thereof with a compound of the formula

wherein Hal, R and $R_1$ have the same meaning as given above and X represents a halogen atom or the hydroxyl radical. Some examples of suitable functional derivatives of the 4-halo-3-sulfamoylbenzoic acids of the above formula are the acid halides, activated esters, anhydrides, and the like. Where X represents the hydroxyl radical, the reaction is conveniently effected by employing the acid halide of a 4-halo-3-sulfamoylbenzoic acid of the above formula and preferably the acid chloride. The reaction is advantageously conducted in a solvent medium. Examples of suitable solvents for purposes of this reaction are benzene, toluene, chloroform and similar non-reactive organic solvents or the compound HO—$R_1$ used in the reaction. The relative proportions of the reactants are not critical and the compound HO—$R_1$ is preferably employed in excess of the amount required to convert the acyl halide group to the carboxyester group. The esters of the invention are formed in excellent yields at room temperature, however, the reaction is favored by temperatures in excess of 50° C. and preferably carried out between 50 and 150° C. If desired a base such as pyridine may be added to bind the hydrohalic acid formed in the course of the reaction.

Where X represents a reactive halogen atom, the esterification of the free carboxylic acid group proceeds readily in a solvent medium in the presence of a base such as triethylamine, pyridine, potassium carbonate and the like. The reaction mixture should preferably contain an excess of that amount of base required to bind the hydrohalic acid formed in the course of the reaction. Suitable solvents for the reaction are lower molecular weight aliphatic ketones, such as acetone and methyl ethyl ketone. In carrying out the reaction it is generally satisfactory to employ substantially equivalent quantities of the reactants. The time and temperature of the reaction are not critical, however, the reaction is favored by temperatures in excess of 50° C. and preferably carried out between 50 and 150° C.

The acyl halides employed as starting materials for the reaction can be prepared by treating a 4-halo-3-sulfamoylbenzoic acid of the above formula with a suitable inorganic acid halide such as e.g. thionyl chloride, phosphorus tribromide or phosphorus oxychloride. The most convenient and preferred reagent is thionyl chloride.

The 4-halo-3-sulfamoylbenzoic acids of the above formula can be prepared by the chlorosulfonation of 4-bromo- or 4-chlorobenzoic acid with an excess of chlorosulfonic acid at 100° to 150° C., followed by reacting the resulting 4-halo-3-(chlorosulfonyl)benzoic acid with at least three equivalents of ammonia or methylamine in a solvent medium such as water or a lower molecular weight alcohol at a temperature between 15° and 30° C.

The novel 4-halo-3-sulfamoylbenzoic acid esters of the invention are useful as diuretics. They have the property of augmenting the urine volume together with cation and chloride ion excretion. They can be administered orally. A suitable oral daily dose of the compounds of the invention is between about 2.5 and 30 mg. per kg. of body weight. For oral administration, the products of the invention can be combined with either a solid or liquid carrier or diluent and made available in such conventional vehicles as tablets, capsules, powders, aqueous and non-aqueous suspensions and solutions in varying amounts. For convenience in symptomatically adjusting the dosage in accordance with the requirement of the individual patient, the dosage forms are preferably prepared so that each unit will contain 50, 100, 150, 250, or 500 mg. of the active ingredient.

The invention is illustrated, but not limited, by the following examples:

*Example 1*

25.0 g. of 4-chloro-3-sulfamoylbenzoyl chloride is added portionwise to 100 ml. of refluxing absolute methanol. Refluxing is continued for an additional half hour and the methanol evaporated in vacuo. The residue is dissolved in warm water, the aqueous solution cooled, and the 4-chloro-3-sulfamoylbenzoic acid methyl ester collected by filtration, washed with water and dried in vacuo at 50° C.; M.P. 129–130° C. after recrystallization from an aqueous methanol mixture.

In like manner, by substituting 25.0 g. of 4-bromo-3-

(methylsulfamoyl)benzoyl chloride for the 25.0 g. of 4-chloro-3-sulfamoylbenzoyl chloride in the above procedure, 4-bromo-3-(methylsulfamoyl)benzoic acid methyl ester is obtained.

The 4-chloro-3-sulfamoylbenzoyl chloride employed as starting material can be prepared by the following method: 78.2 g. of 4-chlorobenzoic acid and 330 ml. of chlorosulfonic acid are mixed and heated for six hours at 140° C. The reaction mixture is allowed to stand overnight and the unreacted chlorosulfonic acid decomposed by adding the reaction mixture dropwise to a crushed ice-water mixture. The 4-chloro-3-(chlorosulfonyl)benzoic acid is collected by filtration, washed with water and dissolved in ether. The ethereal solution is washed with water, dried over calcium chloride and the solvent removed by distillation.

143 g. of 4-chloro-3-(chlorosulfonyl)benzoic acid is added with stirring and cooling to 250 ml. of concentrated ammonium hydroxide. The reaction mixture is allowed to react at room temperature for two hours. The 4-chloro-3-sulfamoylbenzoic acid is precipitated from the cooled reaction mixture by the addition of hydrochloric acid, collected by filtration, washed with water and dried in vacuo at 60° C.; M.P. 255–260° C.

20 g. of 4-chloro-3-sulfamoylbenzoic acid and 200 ml. of thionyl chloride are heated at reflux for 4¾ hours. The excess thionyl chloride is removed by distillation under reduced pressure to yield the 4-chloro-3-sulfamoylbenzoyl chloride.

Example 2

22.2 g. of 4-chloro-3-sulfamoylbenzoyl chloride is added portionwise to 100 ml. of refluxing absolute ethanol. The reaction mixture is maintained at reflux temperature for an additional half hour and concentrated to dryness in vacuo. The residue is dissolved in warm water, the aqueous solution cooled, and the 4-chloro-3-sulfamoylbenzoic acid ethyl ester collected by filtration, washed with water, and dried in vacuo at 60° C.; M.P. 132–133° C. after recrystallization from an aqueous ethanol mixture.

In like manner, by substituting 23.5 g. of 4-chloro-3-(methylsulfamoyl) benzoyl chloride for the 22.2 g. of 4-chloro-3-sulfamoylbenzoyl chloride in the above procedure, 4-chloro-3-(methylsulfamoyl)benzoic acid ethyl ester is obtained.

Example 3

25.0 g. of 4-bromo-3-sulfamoylbenzoyl chloride is added portionwise to 100 ml. of refluxing absolute ethanol. Refluxing is continued an additional half hour and the excess ethanol evaporated in vacuo. The residue is dissolved in warm water and the aqueous solution cooled. The 4-bromo-3-sulfamoylbenzoic acid ethyl ester which separates on cooling is collected by filtration, washed with water and dried in vacuo at 50° C.; M.P. 127–128° C. after recrystallization from an aqueous ethanol mixture.

Similarly, by substituting 100 ml. of isopropyl alcohol for the 100 ml. of ethanol in the above procedure, 4-bromo-3-sulfamoylbenzoic acid isopropyl ester is obtained.

The 4-bromo-3-(sulfamoyl)benzoyl chloride employed as starting material can be prepared by the following method: 100.5 g. of 4-bromobenzoic acid and 330 ml. of chlorosulfonic acid are heated at 145° C. for eight hours and the reaction mixture allowed to stand overnight. The unreacted chlorosulfonic acid is decomposed by adding the reaction mixture dropwise to a crushed ice-water mixture. The 4-bromo-3-(chlorosulfonyl)benzoic acid is collected by filtration and dissolved in ether. The ethereal solution is washed with water, dried over calcium chloride, and the solvent removed by distillation. The resulting solid is dried at room temperature in vacuo.

50 g. of 4-bromo-3-(chlorosulfonyl)benzoic acid is added portionwise to 250 ml. of concentrated ammonium hydroxide at a temperature of 15° C. After standing three hours at room temperature, the reaction mixture is heated on a steam bath to remove excess ammonia. The solution is cooled and acidified with acetic acid. The 4-bromo-3-sulfamoylbenzoic acid which precipitates is collected by filtration and dried.

20 g. of 4-bromo-3-sulfamoylbenzoic acid is refluxed for six hours in 125 ml. of thionyl chloride. The reaction mixture is then allowed to stand overnight at room temperature, cooled and the 4-bromo-3-sulfamoylbenzoyl chloride which separates is collected by filtration and used without any further purification.

Example 4

10.0 g. of 4-chloro-3-sulfamoylbenzoyl chloride is added portionwise to 50 ml. of refluxing allyl alcohol. The reaction mixture is maintained at refluxing temperature for an additional half hour. The allyl alcohol is evaporated in vacuo and the residue dissolved in warm water. Upon cooling, the 4-chloro-3-sulfamoylbenzoic acid allyl ester which separates is collected by filtration, washed with water and dried in vacuo at 50° C.; M.P. 96–97° C. after recrystallization from an aqueous ethanol mixture.

Example 5

4.2 ml. of triethylamine is added to a stirred suspension of 4.7 g. of 4-chloro-3-sulfamoylbenzoic acid and 2.4 g. of chloromethyl methyl ether in 50 ml. of acetone. Stirring is continued an additional 5 hours and the triethylamine hydrochloride salt which forms in the course of the reaction separated by filtration. The filtrate is diluted with ethyl acetate and the ethyl acetate solution washed successively with aqueous hydrochloric acid, saturated aqueous sodium bicarbonate, and finally with water. The washed ethyl acetate solution is dried over magnesium sulfate and the ethyl acetate solvent evaporated in vacuo. The residue is triturated with petroleum ether and the 4-chloro-3-sulfamoylbenzoic acid methoxymethyl ester collected by filtration and recrystallized from an ethyl acetate-petroleum ether mixture; M.P. 122–124° C.

In like manner, 4-chloro-3-sulfamoylbenzoic acid ethoxymethyl ester is obtained by substituting 2.9 g. of chloromethyl ethyl ether for the 2.4 g. of chloromethyl methyl ether in the above procedure.

Example 6

4.2 ml. of triethylamine is added to a stirred suspension of 4.7 g. of 4-chloro-3-sulfamoylbenzoic acid and 2.3 g. of chloroacetonitrile in 40 ml. acetone. The reaction mixture is heated at reflux for 5 hours, cooled, and the triethylamine hydrochloride which forms in the course of the reaction separated by filtration. The acetone solvent is evaporated in vacuo and the semi-solid residue triturated with 5 N-hydrochloric acid. The 4-chloro-3-sulfamoylbenzoic acid cyanomethyl ester is collected by filtration and washed successively with water, dilute aqueous sodium bicarbonate and finally with water; M.P. 185–187° C. after recrystallization from an acetonitrile-ether mixture.

Example 7

4.2 ml. of triethylamine is added to a stirred suspension of 5.6 g. of 4-bromo-3-sulfamoylbenzoic acid and 2.3 g. of chloroacetonitrile in 40 ml. of acetone. The reaction mixture is then heated at reflux for 5 hours and then cooled. The triethylamine hydrochloride which forms in the course of the reaction is separated by filtration and the acetone solvent evaporated in vacuo. The residue is triturated with 5 N-hydrochloric acid and the 4-bromo-3-sulfamoylbenzoic acid cyanomethyl ester collected by filtration and washed successively with water, dilute aqueous sodium bicarbonate, and finally with water; M.P. 199–200° C. after recrystallization from an aqueous acetone mixture.

Example 8

7.0 g. of 4-chloro-3-sulfamoylbenzoic acid is added to a mixture of 5.1 g. of diethylaminoethyl chloride hydrochloride and 6 g. of potassium carbonate in a mixture of 10 ml. of N,N-dimethylformamide and 25 ml. of ethyl acetate. The reaction mixture is heated at reflux temperature with stirring overnight, cooled and the precipitate which forms collected by filtration and washed with ethyl acetate. The dried solid precipitate is extracted with boiling absolute methanol. The methanol solvent is evaporated from the methanolic extracts in vacuo, and the residue dissolved in ethyl acetate. The pH of the ethyl acetate solution is adjusted to between 7.5 and 8.0 with glacial acetic acid and the mixture cooled. The 4-chloro-3-sulfamoylbenzoic acid diethylaminoethyl ester acetic acid salt which separates upon cooling is collected by filtration and dried; M.P. 153–156° C. after recrystallization from ethyl acetate.

The following compounds can also be prepared by reaction, in the manner described, of a 4-halo-3-sulfamoylbenzoic acid and the corresponding lower dialkylaminoalkyl halide:

4-chloro-3-sulfamoylbenzoic acid dimethylaminoethyl ester
4-bromo - 3 - sulfamoylbenzoic acid diethylaminoethyl ester.

Example 9

3.0 ml. of triethylamine is added to a stirred suspension of 4.7 g. of 4-chloro-3-sulfamoylbenzoic acid and 3.1 g. benzyloxymethyl chloride in 50 ml. of acetone. The reaction mixture is maintained at reflux temperature overnight and then cooled. The triethylamine hydrochloride which forms in the course of the reaction is separated by filtration and the acetone solvent evaporated in vacuo. The residue is triturated with 5 N-hydrochloric acid and 4-chloro-3-sulfamoylbenzoic acid benzyloxymethyl ester collected by filtration, washed successively with water, dilute aqueous sodium bicarbonate and finally with water; M.P. 82–84° C. after recrystallization from an ethyl acetate-petroleum ether mixture.

In like manner, by substituting 5.6 g. of 4-bromo-3-sulfamoylbenzoic acid for the 4.7 g. of 4-chloro-3-sulfamoylbenzoic acid, 4-bromo - 3 - sulfamoylbenzoic acid benzyloxymethyl ester is obtained.

Example 10

4.2 ml. of triethylamine is added to a stirred suspension of 4.7 g. of 4-chloro-3-sulfamoylbenzoic acid and 3.0 g. of chloromethylmethyl sulfide in 50 ml. of acetone. Stirring is continued at reflux for an additional 5 hours and the triethylamine hydrochloride which forms in the course of the reaction is separated by filtration. The acetone solvent is evaporated in vacuo and the residue dissolved in ethyl acetate. The ethyl acetate solution is washed successively with aqueous hydrochloric acid, saturated aqueous sodium bicarbonate and finally with water. The washed ethyl acetate solution is dried over magnesium sulfate and the ethyl acetate solvent evaporated in vacuo. The residue is triturated with petroleum ether and 4-chloro-3-sulfamoylbenzoic acid methylthiomethyl ester collected by filtration and recrystallized from an ethyl acetate-petroleum ether mixture; M.P. 120–122° C.

Similarly, by substituting 5.82 g. of 4-bromo-3-(methylsulfamoyl)benzoic acid for the 4.7 g. of 4-chloro-3-sulfamoylbenzoic acid in the above procedure, 4-bromo-3-(methylsulfamoyl)benzoic acid methylthiomethyl ester is obtained.

Example 11

5.6 ml. of triethylamine is added to a stirred suspension of 8.4 g. of 4-bromo-3-sulfamoylbenzoic acid and 3.2 g. of chloromethyl methyl ether in 100 ml. of acetone. Stirring is continued at room temperature overnight and the triethylamine hydrochloride salt which forms in the course of the reaction separated by filtration. The filtrate is diluted with ethyl acetate and the ethyl acetate solution washed successively with aqueous hydrochloric acid, saturated aqueous sodium bicarbonate, and finally with water. The washed ethyl acetate solution is dried over magnesium sulfate and the ethyl acetate solvent evaporated in vacuo. The residue is triturated with petroleum ether and the 4-bromo-3-sulfamoylbenzoic acid methoxymethyl ester collected by filtration and recrystallized from an ethyl acetate-petroleum ether mixture; M.P. 127–129° C.

Example 12

Triethylamine (3 ml.) is added to a stirred suspension of 4.7 g. of 4-chloro-3-sulfamoylbenzoic acid and 3.3 g. of ethyl bromoacetate in 60 ml. of acetone. The reaction mixture is heated at reflux for 15 hours, cooled, and the triethylamine hydrobromide which forms in the course of the reaction separated by filtration. The acetone is evaporated in vacuo and the semi-solid residue triturated with 5 N-hydrochloric acid. The 4-chloro-3-sulfamoylbenzoic acid ethoxycarbonylmethyl ester which separates is collected by filtration and washed successively with water, dilute aqueous sodium bicarbonate and finally water; M.P. 124–126° after recrystallization from an ethyl acetate-petroleum ether mixture.

Example 13

Triethylamine (5.6 ml.) is added to a stirred suspension of 7.5 g. of 4-chloro-3-(methylsulfamoyl)benzoic acid and 3.2 g. of chloromethyl methyl ether in 100 ml. of acetone. The reaction mixture is stirred at reflux for 8 hours, cooled, and the triethylamine hydrochloride which forms in the course of the reaction removed by filtration. The filtrate is evaporated in vacuo and the 4 - chloro - 3 - (methylsulfamoyl)benzoic acid methoxymethyl ester recrystallized from an ethyl acetate-petroleum ether mixture; M.P. 81–83° C.

The 4-chloro-3-(methylsulfamoyl)benzoic acid employed as starting material can be prepared by the following method: 78.2 g. of 4-chlorobenzoic acid and 330 ml. of chlorosulfonic acid are mixed and heated for six hours at 140° C. The reaction mixture is allowed to stand overnight and the unreacted chlorosulfonic acid decomposed by adding the reaction mixture dropwise to a crushed ice-water mixture. The 4-chloro-3-(chlorosulfonyl)benzoic acid is collected by filtration, washed with water and dissolved in ether. The ethereal solution is washed with water, dried over calcium chloride and the solvent removed by distillation.

30.0 g. of the 4-chloro-3-(chlorosulfonyl)benzoic acid is added to 100 ml. of a chilled 25% solution of aqueous methylamine. The reaction mixture is allowed to stand at room temperature for four hours and then the solvent is distilled under reduced pressure. The residue is dissolved in 100 ml. of water and the solution clarified with activated charcoal. The solution is acidified to pH 6 with acetic acid, filtered to remove the precipitate formed on acidification and the desired 4 - chloro - 3 - (methylsulfamoyl)benzoic acid precipitated from the filtrate by the addition of hydrochloric acid. The product is collected by filtration and recrystallized from aqueous alcohol; M.P. 230–2° C.

Example 14

Triethylamine (3.0 ml.) is added to a stirred suspension of 4.7 g. of 4-chloro-3-sulfamoylbenzoic acid and 2.5 g. of chloromethyl n-butyl ether in 60 ml. of acetone. The reaction mixture is stirred at reflux for 15 hours, cooled, and the triethylamine hydrochloride removed by filtration. The filtrate is evaporated in vacuo and the residue is dissolved in ethyl acetate and washed with water and aqueous sodium bicarbonate. The ethyl acetate solution is dried over anhydrous magnesium sulfate and the ethyl acetate evaporated in vacuo. The 4-chloro-3-sulfamoylbenzoic acid butoxymethyl ester is recrystallized from petroleum ether; M.P. 85° C.

What is claimed is:
1. A compound of the formula

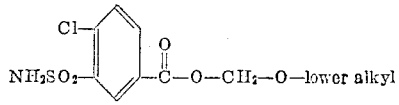

2. 4-chloro-3-sulfamoylbenzoic acid methoxymethyl ester.
3. 4-bromo-3-sulfamoylbenzoic acid methoxymethyl ester.

References Cited in the file of this patent
UNITED STATES PATENTS

| | | |
|---|---|---|
| 2,789,938 | Wilcox et al. | Apr. 23, 1957 |
| 2,910,488 | Novello | Oct. 27, 1959 |
| 2,952,680 | Novello | Sept. 13, 1960 |
| 3,055,905 | Graf et al. | Sept. 25, 1962 |

FOREIGN PATENTS

| | | |
|---|---|---|
| 1,028,560 | Germany | Apr. 24, 1958 |

OTHER REFERENCES

Shriner et al.: Identification of Organic Compounds, New York, 1948, page 154.

Beilstein, volume 11, 1928, pages 387 and 388, second supplement, volume 11, 1950, page 218.